Feb. 26, 1924.

S. B. SHOEMAKER 1,485,304

HYDRAULIC BRAKE

Filed April 11, 1922

WITNESSES

INVENTOR
S. B. Shoemaker
BY
ATTORNEYS

Patented Feb. 26, 1924.

1,485,304

UNITED STATES PATENT OFFICE.

SAMUEL BRINTON SHOEMAKER, OF SOUTH STRAFFORD, VERMONT.

HYDRAULIC BRAKE.

Application filed April 11, 1922. Serial No. 551,556.

*To all whom it may concern:*

Be it known that I, SAMUEL BRINTON SHOEMAKER a citizen of the United States, and a resident of South Strafford, in the county of Orange and State of Vermont, have invented a new and Improved Hydraulic Brake, of which the following is a description.

My invention relates to a hydraulic brake and while adapted for use generally where a brake of the type may be useful it is especially adapted for use as an automobile brake.

The general object of the invention is to provide a brake that will not burn out in descending steep declivities, nor rapidly wear down, nor swell, and lose its efficiency when highly heated.

A further important object of the invention is to provide an efficient brake capable of ready adjustment to vary the braking action.

The invention also has for an important object to provide a brake that may be arranged to automatically give the maximum braking power to bring the machine to stop within the shortest possible distance, and to hold the brake after an automobile has been stopped on a hill for example.

The invention furthermore contemplates the production of a hydraulic brake and manually operable means to lock the brake in a manner to cause it to function for stopping the turning of the drive shaft of the vehicle in connection with which the brake is employed.

The manner in which the above and other objects are attained will clearly appear as the description proceeds.

Reference is to be had to the accompanying drawings forming a part of this specification, it being understood that the drawings are merely illustrative of one example of the invention.

Figure 1:
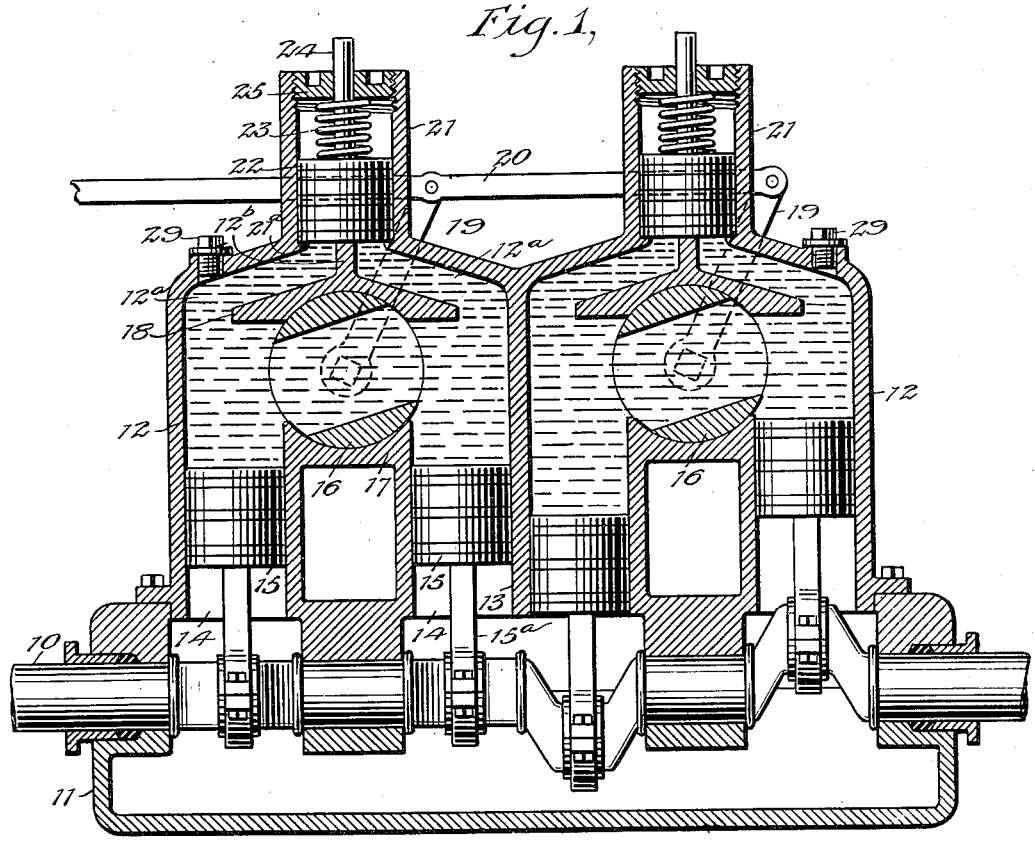
Figure 2:
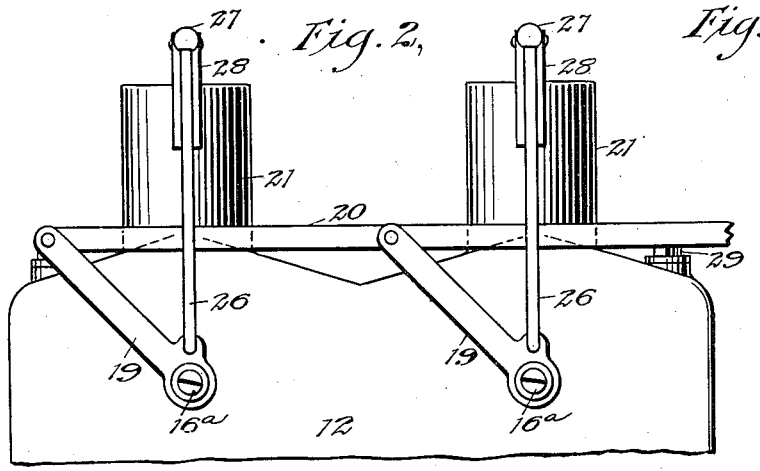
Figure 3:
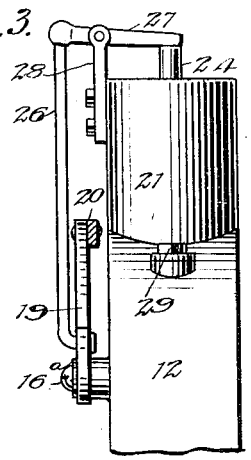

Figure 1 is a vertical section of a hydraulic brake embodying my invention;

Figure 2 is a side elevation of the upper portion of the embodiment shown in Figure 1;

Figure 3 is an end view of the upper portion of the embodiment.

In carrying out my invention in accordance with the illustrated example the crank shaft 10 is arranged to turn in suitable bearings in a case 11. Mounted on said case are chambers 12 adapted to contain oil or other fluid. The chambers are divided by a vertical partition 13. Each chamber is formed with a pair of cylinders 14 in which pistons
15 operate and arranged to be actuated by connecting rods 15ª from the crank shaft 10. Both cylinders of the pair communicate with a chamber 12.

In the chamber 12 in a plane between the cylinders 14 is disposed a rockable valve 16, the passage of which may be made to establish a more or less free communication between the cylinders 14 or to restrict or cut off said communication. The valve in each chamber 12 turns between a curved seat 17 at the bottom of the valve and a head 18 above the valve. The stems of the valve 16 in the respective chambers 12 are each provided with a rocker arm 19, the respective arms being pivotally connected by a manually operable rod 20.

With the above described arrangement the turning of the shaft 10 which may represent an extension of the crank shaft of an automobile motor, may be retarded by the braking action of the fluid in the chambers 12 opposing the operation of the piston 15 by restricting to the desired extent the passage afforded by the valve 16 merely by turning said valves through the medium in the present example of rod 20 and rocker arms 19. The more the passage through the valve is restricted the greater braking action on the crank shaft.

In association with the brake means represented by the pistons 14, the fluid chambers 12 and valves 16, I provide an automatic brake means for which purpose use is made of reduced auxiliary cylinder extensions 21 on the chambers 12 at the top, each chamber 12 being in communication with an auxiliary cylinder 21 through ports 12ª above the head 18, said ports being separated by a central partition or barrier 12ᵇ. In each cylinder 21 a piston 22 operates, the back of the piston being adapted to move to an annular seat 21ª at the base of each cylinder 21 to thereby establish or cut off communication between the side ports 12ª of a pair by the forward and return movements of the piston 22. A spring 23 is coiled about a stem 24 rising from each piston 22, said stem extending through screw plug 25 in the top of the cylinder 21. The screw plug 25 serves to vary the tension of the spring 23 for controlling the movements of the piston to afford passage for the fluid in the chamber 12 over the partition 12ᵇ, through the lower portion of the cylinder 21.

With the above described arrangement the cylinders 21 and the pistons 22 constitute in effect safety valves, the ports 12ᵃ when placed in communication by the piston 22 constituting a by-pass, the arrangement serving as a means to obtain the maximum braking power, that is to say, the use of the braking force to the point just before the wheels of the automobile begin to slide. Thus, when the automobile is running fast the valves 16 may be completely closed and the valve pistons 22 will then automatically result in the maximum braking power determined by the tension of the springs 23 to bring the automobile to a stop in the shortest possible distance and hold it when stopped on a hill for example.

In Figures 2 and 3 is shown a means for locking the pistons 22 against movement and thereby absolutely locking the wheels of the automobile as far as turning by the main drive shaft is concerned. The locking means as illustrated comprises a link 26 pivotally secured at one end to a rocker arm 19 adjacent to the axis of the stem of the valve 16, the upper ends of said links being pivotally connected with one arm of levers 27 which are fulcrumed between their ends on any fixed part of the structure such as standards 28. The opposite arm of a lever 27 is adapted to bear against the stem 24 of a piston 22. The arrangement of the described locking means is such that a movement of the rod 20 will so move the rocker arms 19 as to close the valve 16 before the levers 27 reach a position to lock the stems 24 against movement. A slight further movement, however, of the arms 19 would act through the links 26 to bring the levers 27 against the stems 24, thereby locking the pistons 22 against movement. Screws 16ᵃ secure arms 19 to the stems of valves 16.

Connecting rods 15ᵃ of a pair of pistons 15 operating in a given chamber 12 are 180° apart and the crank rods of the respective pairs of pistons are quartered.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. In a hydraulic brake, a fluid chamber communicating with a pair of cylinders, means affording a passage from one cylinder to the other, a manually-variable valve controlling said passage, means forming a by-pass to establish a communication between said cylinders independently of the first-mentioned passage, and automatic means controlling said by-pass and actuated by the pressure of the fluid in the chamber.

2. In a hydraulic brake a fluid chamber divided into a pair of compartments and formed with means presenting a passage to afford communication between the compartments, a manually-variable valve controlling said passage, said chamber forming also a by-pass for an auxiliary communication between the compartments, and automatic means actuated by the fluid pressure in the compartments controlling said by-pass, together with means to prevent said automatic means from functioning.

3. In a hydraulic brake, a fluid chamber affording a passage therethrough, a manually variable valve controlling said passage, a by-pass in communication with said chamber, and automatic means permitting fluid to flow through the by-pass under predetermined pressure, means to hold said automatic means against functioning, and controlling means for the locking means operable by a movement of the manually operated valve varying means.

4. In a hydraulic brake, a fluid chamber, a pair of cylinders communicating with said chamber, pistons operating in said cylinders and adapted to force fluid from one cylinder to another through said chamber, valve means to control the flow from one cylinder to the other, a by-pass adapted to afford flow of fluid from one side of the chamber to the other, and spring-pressed means subject to the pressure produced in said chamber by said pistons and controlling said by-pass.

5. In a hydraulic brake, a fluid chamber, a pair of cylinders communicating with said chamber, pistons operating in said cylinders and adapted to force fluid from one cylinder to another through said chamber, valve means to control the flow from one cylinder to the other, an auxiliary cylinder, ports establishing communication between opposite sides of the chamber and said auxiliary cylinder, and a piston in said auxiliary cylinder and controlling the communication between said ports, said piston being automatically yieldable to predetermined pressure.

6. In a hydraulic brake a casing presenting a pair of cylinders adjacent its bottom and a second cylinder at its top, a division member extending into the said casing from the bottom end of said top cylinder, a valve interposed between the wall formed between the bottom cylinders and said division member, said division member being formed with an opening, and a spring-actuated piston valve in said top cylinder for controlling said opening.

SAMUEL BRINTON SHOEMAKER.